US006483556B1

(12) United States Patent
Karakawa et al.

(10) Patent No.: US 6,483,556 B1
(45) Date of Patent: Nov. 19, 2002

(54) LASER VIDEO DISPLAY SYSTEM AND METHOD

(75) Inventors: Masayuki Karakawa, Marlborough, MA (US); Robert J. Martinsen, Amesbury, MA (US); Stephen R. McDowell, Litchfield, NH (US)

(73) Assignee: Corporation for Laser Optics Research, Portsmouth, NH (US)

( * ) Notice: Subject to any disclaimer, the term of this patent is extended or adjusted under 35 U.S.C. 154(b) by 0 days.

(21) Appl. No.: 09/355,599

(22) PCT Filed: Jan. 28, 1998

(86) PCT No.: PCT/US98/01719

§ 371 (c)(1),
(2), (4) Date: Jul. 27, 1999

(87) PCT Pub. No.: WO98/35504

PCT Pub. Date: Aug. 13, 1998

Related U.S. Application Data

(60) Provisional application No. 60/036,437, filed on Jan. 28, 1997.

(51) Int. Cl.[7] .............................. H04N 9/31; H04N 5/74
(52) U.S. Cl. ........................ 348/750; 348/754; 353/31
(58) Field of Search .............................. 348/739, 744, 348/750, 752, 754, 755, 756, 757, 759, 762, 764, 769, 760, 770, 771, 772, 190–205; 353/31, 34, 37; 359/216, 217, 214, 212; H04N 9/31, 5/74

(56) References Cited

U.S. PATENT DOCUMENTS

| 3,818,129 A | 6/1974 | Yamamoto ............... 178/7.3 D |
| 4,720,747 A | 1/1988 | Crowley ..................... 358/231 |
| 4,851,918 A | 7/1989 | Crowley ..................... 358/231 |
| 5,253,073 A | 10/1993 | Crowley ..................... 358/231 |
| 5,317,348 A | 5/1994 | Knize ......................... 353/31 |
| 5,715,021 A | 2/1998 | Gibeau ....................... 348/750 |

*Primary Examiner*—Michael Lee
(74) *Attorney, Agent, or Firm*—Ropes & Gray

(57) ABSTRACT

A full color, pulsed laser video system having solid state red (R), green (G) and blue (B) lasers (10, 12, 14) as a source, and with a projection screen having a two-channel image (24) for the screen, and with optical fiber remote image delivery (30).

14 Claims, 9 Drawing Sheets

LASER VIDEO DISPLAY SYSTEM AND METHOD

REFERENCE TO PRIOR APPLICATIONS

This application incorporates by reference and claims the benefit of U.S. Provisional Application Ser. No. 60/036,437, filed Jan. 28, 1997.

BACKGROUND OF THE INVENTION

A pulsed laser video imaging system and method is set forth in U.S. Pat. Nos. 4,720,747 and 4,851,918, issued on Jan. 19, 1988, and Jul. 25, 1989, respectively, both hereby incorporated by reference. These patents describe a video imaging system responsive to input signals representing a video image and employ one or more pulsed lasers, such as metal vapor lasers, to provide one or more monochromatic light sources.

SUMMARY OF THE INVENTION

The invention relates to a laser video display system and method. In particular, the invention relates to a full color, laser video image system wherein the pulsed laser light source comprises a green (G) laser with controlled multimode operation to minimize speckle, a tunable blue (B) laser and a red (R) laser with sum of frequency mix.

It is desirable to provide a new and improved pulsed laser projection system and method with one or more of the following improvements. The list of improvements include:
1. all solid state green laser design with controlled multimode operation to minimize speckle;
2. all solid state tunable blue laser design;
3. all solid state red laser design with sum of frequency mix;
4. diode laser pumped, all solid state, monochromatic red, green and blue light source with color space conversion;
5. uniform intensity line generation by a cylindrical asphere lens set;
6. two channel image output with achromatic image inversion;
7. remote image delivery by coherent fiber ribbon;
8. horizontal video line time adjustment (compression and expansion);
9. nonlinear control of vertical scanner (i.e., tangential correction); and
10. horizontal pixel time correction with sub-clock timing.

The various components of the improved laser video image system and method, and the differences and improvements from prior art systems and methods are set forth in detail below.

(1) All Solid State Green Laser Design with Controlled Multimode Operation to Minimize Speckle The original invention described in U.S. Pat. No. 4,720,747 specifies the use of metal vapor lasers as light sources. U.S. Pat. No. 3,818,129, issued Jun. 18, 1974, to Yamamoto, incorporates use of a cw lamp pumped, repetitively Q-switched, frequency doubled Neodymium:Yttrium Alminum Garnet (Nd:YAG) laser (wavelength=532 nm) to be a light source for green, and it cites the short pulse duration and high average power as the primary reasons for the choice of the above-mentioned laser. However, U.S. Pat. No. 3,818,129 fails to mention another important factor affecting image quality, which is output beam quality from the above-mentioned laser.

Generally speaking, the output beam quality from the cw lamp pumped, repetitively Q-switched, frequency doubled, Nd:YAG laser with high output power tends to have a high multimode structure in transverse direction, which results in high beam divergence; therefore producing undesirable image blur at a screen. The above-mentioned laser can be constructed to produce near diffraction limited, single mode output ($TEM_{oo}$ mode) which minimizes the beam divergence; however, $TEM_{oo}$ mode output does maximize laser speckle effect, which is not desirable.

Then what is needed is the cw lamp pumped, repetitively Q-switched, frequency doubled Nd:YAG laser cavity design which produces controlled multimode output in transverse direction that minimizes the laser speckle and still produces reasonably crisp images on the screen surface because of optically manageable beam divergence. $M^2$ is a measurable quantity which characterizes output beam spot size at far field and its divergence. When $M^2$ is equal to one, the output beam is called diffraction limited beam or $TEM_{oo}$ mode, whereas when $M^2$ is large (i.e., ~100), then the output beam is said to have a high multimode structure. The acceptable range of $M^2$ for the laser video display discussed in this invention is semi-empirically determined to be between 10 and 20. To achieve the acceptable range of $M^2$=10–20, the cw lamp pumped, repetitively Q-switched, frequency doubled Nd:YAG laser has an intra-cavity aperture to strip excess modes, and the frequency doubling process is achieved by a Type II LBO (lithium triborate) or KTP (potassium titanyl phosphate) placed within the laser cavity. The schematic drawing of this green laser cavity is shown in FIG. 3.

(2) All Solid State Tunable Blue Laser

Blue light is produced by a frequency doubled Ti:Sapphire ($Ti:Al_2O_3$) laser, which is longitudinally pumped by the cw lamp pumped, repetitively Q-switched, frequency doubled Nd:YAG laser (wavelength=532 nm). The $Ti:Al_2O_3$ laser has broad range of near infrared emission; thus, it can be tuned to a specific wavelength by a set of birefringent plates, and for this particular application, the IR emission is tuned at 900 nm. The frequency doubling process is achieved by placing a Type I LBO or BBO (beta-barium borate) within the $Ti:Al_2O_3$ laser cavity (i.e., intra-cavity frequency doubling), which results in emission of blue light at 450 nm. Finally, the range of blue emission from this frequency doubled $Ti:Al_2O_3$ laser can be tunable by adjusting the angle of the birefringent plates. The schematic drawing of the frequency doubled $Ti:Al_2O_3$ laser is shown in FIG. 4.

(3) All Solid State Red Laser with Sum of Frequency Mix

A cw lamp pumped, repetitively Q-switched Nd:YAG laser produces primary laser radiation of 1064 nm. This 1064 nm radiation is used to pump the potassium titanyl arsenate (KTA) based intracavity optical parametric oscillation (OPO) and sum of frequency mix (SFM) mechanism to produce red light in wavelength between 626 nm and 629 nm. When KTA crystal is pumped by 1064 nm, it has been demonstrated to produce the signal (1520 nm~1540 nm) and the idler (~3540 nm) waves, and unlike KTP, the KTA does not exhibit reabsorption of the idler wavelength (~3540 nm); thus, relatively high conversion efficiency is expected from KTA based OPO once the pump beam exceeds OPO threshold. A separate Type III KTP will be used to achieve the sum of frequency mix process, and it has a phase match angle of 77° for SFM process between the wavelength of 1520 nm~1540 nm and 1064 nm, producing the resultant red wavelength of between 626 nm and 629 nm. Similarly, Type II KTA or Type I LBO can be used to achieve sum of frequency mix (SFM) between 1520~1540 nm and 1064 nm to produce the desired red wavelength of 626~629 nm, instead of Type III KTP discussed above.

The lasing mechanism to generate 1064 nm radiation, and KTA based OPO, and subsequent KTP based SFM process can be placed in the same cavity structure (intra-cavity design) or the two can be separated, depending on peak power of 1064 nm radiation. The schematic drawing of the former cavity design is shown in FIG. 5.

(4) Diode Laser Pumped, All Solid State, Monochromatic Red, Green and Blue Light Source with Color Space Conversion The all solid state red, green and blue laser designs discussed previously are based on cw lamp pump mechanism to produce primary laser radiation of 1064 nm from Nd:YAG crystal. However, diode laser pumped, all solid state red, green and blue laser light source described in U.S. Provisional Patent Application No. 60/032,269, filed Nov. 29, 1996 (Title: "Monochromatic R,G,B Laser Light Source and Display Systems by Masayuki Karakawa), will also be used as an alternative light source to produce three primary colors. This diode laser pumped, all solid state red (wavelength: 626~629 nm), green (wavelength: 532 or 523.5 nm) and blue (wavelength: 450 or 447 nm) laser light source also incorporates digital color space conversion electronics circuit and produces a very short pulse at a high repetition rate.

(5) Uniform Intensity Line Generation by a Cylindrical Asphere Lens Set

In the laser video projection system described in U.S. Pat. Nos. 4,720,747 and 4,851,918, each pulse of laser light having Gaussian intensity distribution, from one or more laser source must be converted to a line by an optical set up, and enters into an acousto-optic cell which acts as a spatial light modulator. In this process it is important to have the optical set up, which converts the laser beam having circular cross section and Gaussian intensity distribution into a well-collimated, uniform intensity, thin line, in order to have good image quality at the screen and achieve maximum coupling with the acousto-optic cells.

In U.S. Pat. Nos. 4,720,747 and 4,851,918, the optical set up, which consists of a pair of cross-cylinder lenses with a collimator is suggested, and in U.S. Pat. No. 3,818,129, no particular optical set up is mentioned in this area. A pair of cross-cylinder lenses with a collimator approach does produce a line; however, the intensity distribution and the line thickness are not uniform across the line.

The improved optical set up disclosed herein consists of a cylindrical asphere lens and a pair of cylinder lenses cemented together to form a collimator set. The primary function of the cylindrical asphere lens is to convert a laser beam with circular cross section and Gaussian intensity distribution into a uniform intensity thin line, and the collimator set, made of a pair of cylinder lenses cemented back to back, keeps the line stray collimated at far field. An aspherical surface of the cylindrical asphere lens is given by equation:

$$X=cy^2/[1+(1-c^2y^2(1+k))^{1/2}]+A_4y^4+A_6y^6+A_8y^8+A_{10}y^{10}+\cdots$$

where k is conic constant and c is curvature.

It is very important to note that inclusion of the higher order terms (i.e., $A_4y^4, A_6y^6, A_8y^8, A_{10}y^{10}, \cdots$) are essential to produce uniform intensity distribution across the entire line; thus, they should not be overlooked. The higher order coefficients such as $A_4, A_6, A_8, A_{10}, \cdots$ are determined based on the precise spatial intensity distribution (a measurable quantity) of the source laser beam.

(6) Two Channel Image Output with Achromatic Image Inversion

For a certain application, it is desirable to project two identical images on two different screen surfaces by one projector. To achieve this effect, it is necessary to:

1. split the image in half by trichroic beam splitter, which transmits 50% of the image through and also reflects the remaining 50% of the image;
2. apply necessary achromatic corrections to the reflected image to compensate color differences among red, green and blue, since the coating on the trichroic beam splitter may not divide red, green and blue images exactly in half;
3. then invert the reflected image, so that its geometry is the same as the transmitted one; and
4. finally, two images, the transmitted and reflected ones, are vertically scanned by two galvanometer driven scanners, controlled by the single electronic circuit, so that the two images are always at sync.

The schematic drawing of optical set up to achieve two image output, with achromatic image inversion, as described above is shown in FIG. 6.

(7) Remote Image Delivery by Coherent Fiber Ribbon

For a certain applications, it is desirable to decouple a main portion of the laser video projector mechanism, which includes red, green and blue lasers, three acousto-optic cells, and other optical components up to zero order focus (ZOF) beam block and a projector head, which includes the galvanometer driven vertical scanner and projection optics, and then connect them with fiber cable.

Since prior to launching into fiber all the imaging functions, including line-thickness control, and R,G,B field matching have been performed, the fiber cable used here should be 1×N coherent fiber ribbon, where N should be a sufficiently large number (integer) and preferably close to the number of horizontal pixels. The coherent fiber ribbon set up is necessary to preserve already encoded video images from one end of the fiber to the other end.

Two different applications are envisioned for this remote image delivery method by 1×N coherent fiber ribbon. The first application is single projector/single display use, and the second application is single projector/multiple display use. The only difference between the two applications is that in the second application, the image is divided in half by a fused fiber image divider prior to launching into two separate 1×N coherent fiber ribbons, which are then connected to two separate projector heads.

The single projector/single display application is shown in FIG. 7 and the single projector/multiple display application is shown in FIG. 8.

(8) Horizontal Video Line Time Adjustment (Compression and Expansion)

In U.S. Pat. Nos. 4,720,747 and 4,851,918, electronic video line time compression (or data compression) concept is included. This allows the use of a smaller size aperture, acousto-optic cell; thus, enabling the input laser light to attain high diffraction efficiency into the first order when the input signal considered is NTSC video signal only.

However, there are many other video signal formats available now, and for certain input signals applications, it is desirable and necessary to expand the input video line time. For example, consider the input signal having the resolution of 1280 (H) pixels by 1024 (V) lines at 72 Hz refresh rate with progressive scan format (non-interlace format): The horizontal video line time for this input signal is approximately equal to 11–12 $\mu$s; whereas, the necessary aperture time for the acousto-optic cell is approximately equal to 22 $\mu$s, if the multi-line writing scheme is implemented. Furthermore, for an anisotropic, acousto-optic cell, such as TeO$_2$ operating in sheer mode, there is not much difference in diffraction efficiencies into the first order between 11 $\mu$s (horizontal length~6.8 mm) aperture and 22 $\mu$s (horizontal length~13.6 mm). Therefore, what is needed is not just video line time compression, but video line time adjustment, which includes compression and expansion means to manipulate input video line time best suited for different applications.

The input video line time expansion can be achieved in a similar manner as video line time compression by:

1. storing input each horizontal video line data into line or frame buffers momentarily;
2. retrieving the stored data from the line or frame buffers with different rates from the input video signal;
3. sending the output video signal to one or more transducers attached to acousto-optic cells; and
4. when the output video signal rate is shorter than the input one, the signal is compressed; whereas, if the output video signal rate is longer than the input one, the signal is expanded in time domain.

(9) Nonlinear Control of Vertical Scanner

Generally speaking, a galvanometer based vertical scanner, driven by linear ramp signal, makes incremental vertical sweep, with equally spaced angular displacement for given oscillation rate, and its linearity (i.e., each angular displacement) is known to be excellent.

However, when the galvanometer based vertical scanner is used to project each horizontal video line onto the screen surface with relatively short throw distance, the equally spaced angular displacement motion of the vertical scanner, driven by a series of linear ramp signals, does not translate into equal spatial spacing of each horizontal line at the screen surface. The actual result is that the horizontal line spacing is closer together at the top and bottom of the screen, and they are more apart at the center of the screen. In order to achieve equal spatial spacing of each horizontal line at the screen surface, the galvanometer driven vertical scanner has to be driven by nonlinear ramp signals, providing unequally spaced angular displacement motion.

Refer to FIG. 9, which shows each angular displacement of the vertical scanner and the screen surface, the $i^{th}$ incremental angular displacement made by the vertical scanner resulting in the projection of the $i^{th}$ horizontal line onto the screen is given by the equation:

$$A_i = \text{ArcTan}\ [\text{Tan}\ (A_{i-1} + A_{i-2} + A_{i-3} + \cdots + A_2 + A_1) + \text{Tan}\ A_1] - (A_{i-1} + A_{i-2} + A_{i-3} + \cdots + A_2 + A_1)$$

Where:

$A_1$=ArcTan (L/D)

L=Identical spacing for each horizontal line at the screen surface=H/N

H=Height of the screen

N=Total number of horizontal lines=vertical resolution of the image

D=Distance between the scanner and the center of the screen

The nonlinear angular displacement of the vertical scanner given by the equation above is used to calculate each angular displacement corresponding to each projected horizontal line, and the results can be programmed into look up tables within firmware, then the programmed data can be used to provide necessary electronics correction to ramp signal (tangential correction) which drives the vertical scanner.

(10) Horizontal Pixel Time Correction with Sub-clock Timing

When the laser video projector described in this invention is used with relatively short throw distance from the screen surface, the projected image suffers from a distortion known as "pin cushion" effect.

This distortion originates from the fact that it takes a longer time for a pixel to reach the upper or lower section of the screen than to reach the center section of the screen; therefore, the pixels at the top and bottom section of the screen expand more than those at the center section, resulting in the image having bow-shaped left and right edges.

In order to correct this image distortion, pixel by pixel-based time correction is needed such a manner, that additional time is assigned to a group of pixels corresponding to the center section of the image; whereas, lesser time is assigned to a group of pixels corresponding to the four upper and lower corners of the image. This pixel time correction is implemented within the acousto-optic cell in the following manner:

Consider a case with a video pixel time equal to 28 ns. Normally, this pixel signal is generated by 36 MHz master clock (f=1/28 ns~36 MHz) and pixel time interval does not change across the given video line within the acousto-optic cell. However, the additional sub-clock circuit oscillating at 500 MHz will provide +/−2 ns change into the master clock circuit oscillating at 36 MHz, and the result enables the combined clock signal circuits to generate pixel time varying (28+/−2.N)ns (where N is integer=0, 1, 2, . . . ). With this additional sub-clock circuit, the pixel time can be adjusted across the given video line so that shorter pixel time is assigned to a group of pixels at the both edges and longer time is assigned to a group of pixels at the center section of the video line.

This pixel time correction with sub-clock circuit produces the predistorted image within the acousto-optic cell, which will compensate for the "pin cushion" problem at the screen surface, resulting in an image with straight line left and right edges as desired.

The invention will be described for the purpose of illustration only in connection with certain illustrated embodiments; however, it is recognized that various changes, modifications, additions and improvements may be made in the illustrative embodiments without departing from the spirit and scope of the invention.

BRIEF DESCRIPTION OF THE DRAWINGS

The laser video image system has been described with various improvements and components, implying particular red (R), green (G), and blue (B) lasers as the laser light source; however, it is recognized that other embodiments alone, or in combination, as described and shown, may be employed with other and prior art pulsed laser sources.

DESCRIPTION OF THE EMBODIMENTS

Figure 1:
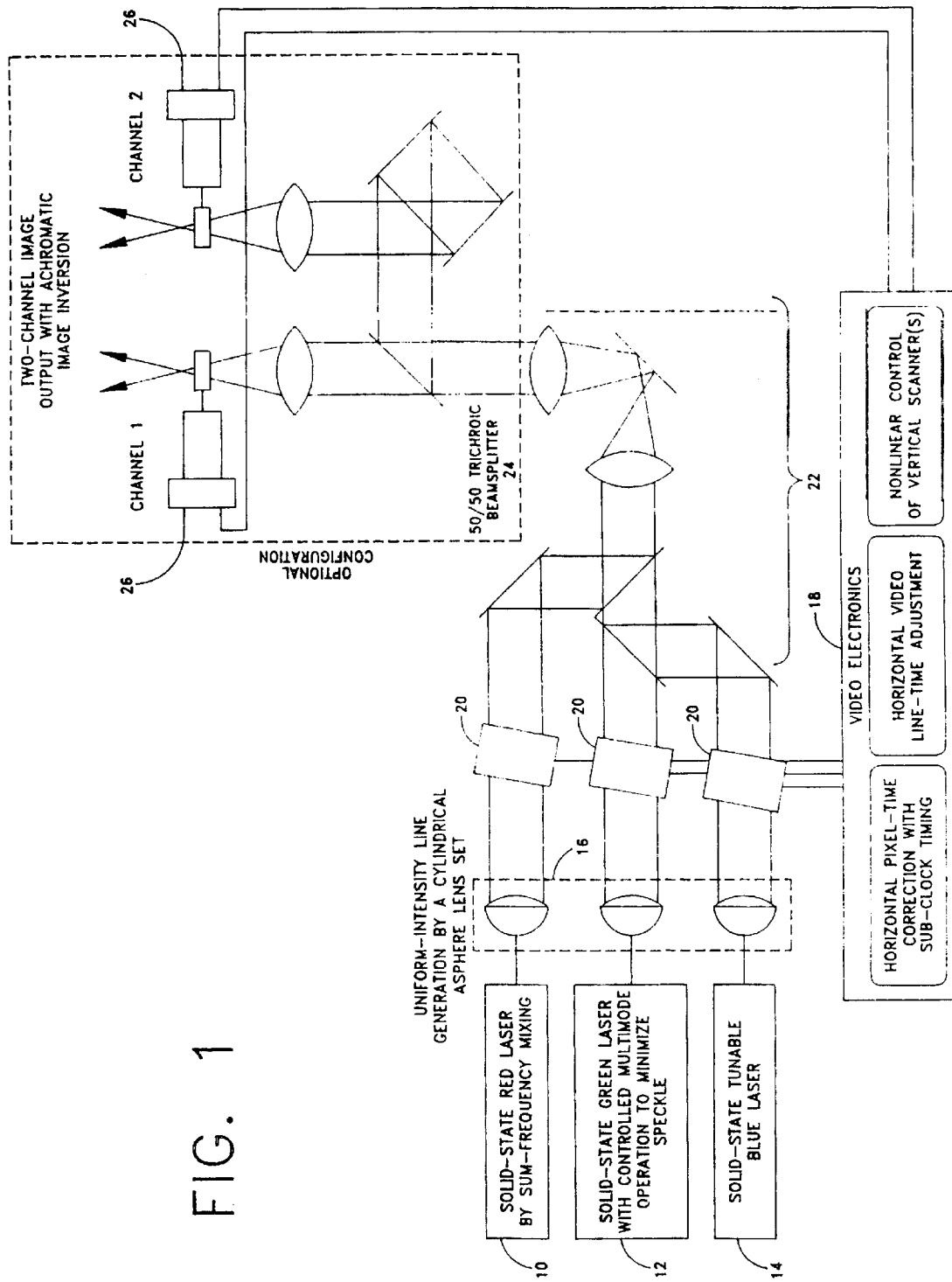
FIG. 1 is a functional block flow diagram of a video display system of the invention.

FIG. 1 shows a functional block flow diagram of a laser video display system discussed in this invention, which consists of an all solid state R, G, B pulsed laser light sources that comprise a red laser 10 utilizing sum of frequency mix to generate desirable red wavelength, a green laser 12 with controlled multimode operation to minimize speckle and a wavelength tunable blue laser 14.

The system includes a cylindrical asphere lens set 16 which generates uniform intensity line from output beam of each R, G, B pulsed laser light source. The system also includes a video electronic circuit 18 that includes horizontal pixel time correction with sub-clock timing mechanism, horizontal video line time adjustment and nonlinear control of vertical scanner angles; and an acousto-optical modulator 20 with transducers (shown here as AOM) which receives corrected video signals in a form of RF signals from the video electronics circuit. The system includes beam reflective and lens optics formation to combine separate R, B, G images to form a full color image.

Also shown in FIG. 1 is an optional optical design utilizing 50/50 trichroic beam splitter 24 to divide the full color image in half (the transmitted one and the reflected one), then apply achromatic correction and image inversion onto the reflected image, and finally, vertically scan the two images with two scanners 26 driven in sync to each other.

Figure 2:
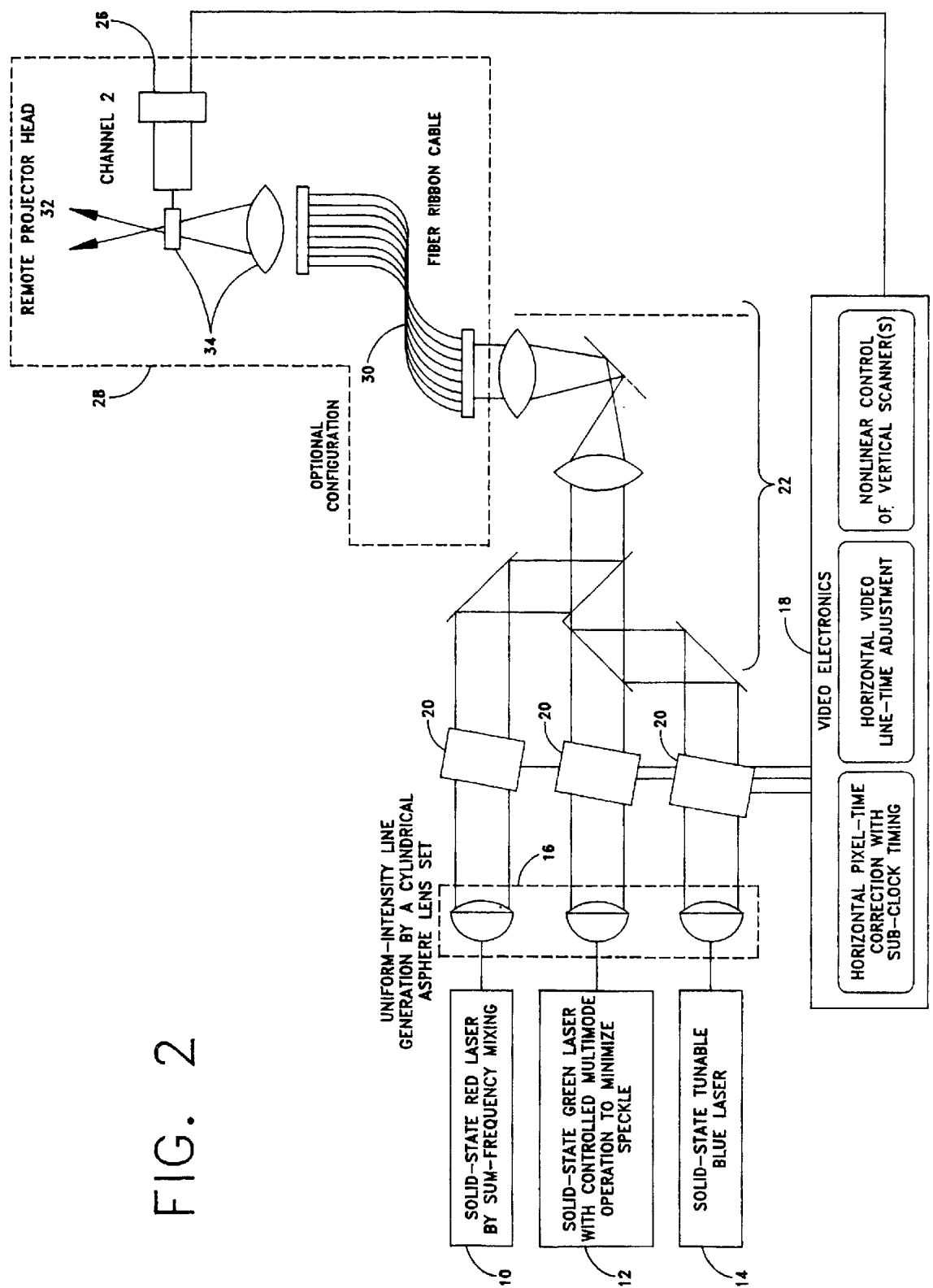
FIG. 2 is a functional block flow diagram of another embodiment of the system of the invention.

FIG. 2 shows a functional block flow diagram of a laser video display system discussed in this invention, which consists of:

i) all solid state R,G, and B pulsed laser light sources which comprise a red laser 10 utilizing sum of frequency mix to generate desirable red wavelength, a green laser 12 with controlled multimode operation to minimize speckle, and wavelength tunable blue laser 14;

ii) a cylindrical asphere lens set 16 which generates uniform intensity line from output beam of each R, G, B pulsed laser light source;

iii) video electronics circuit 18 which includes horizontal pixel time correction with sub-clock timing mechanism, horizontal video line time adjustment and nonlinear control of vertical scanner angles;

iv) acousto-optical modulator 20 with transducers [shown here as AOM (acousto-optical modulator)] which receives corrected video signals in a form of RF signals from the video electronics circuit; and v) R,G, B formation optics 22 to combine separate R,G, B images to form a full color image.

Also shown in FIG. 2 is an optional full color image delivery design 28 by coherent fiber ribbon to the remote locations. This remote image delivery by coherent fiber ribbon 30 enables the decoupling of the main body of the laser video projection system and relatively smaller size projection head 32 which consists of a vertical scanner 26 and a set of projection optics 34.

There are two possible applications of this remote image delivery by coherent fiber ribbon 30:

i) to connect the laser video projection system and one projector head 32; or ii) to connect the laser video projection system with 50/50 beam splitter incorporated and two independent projector heads.

Figure 3:
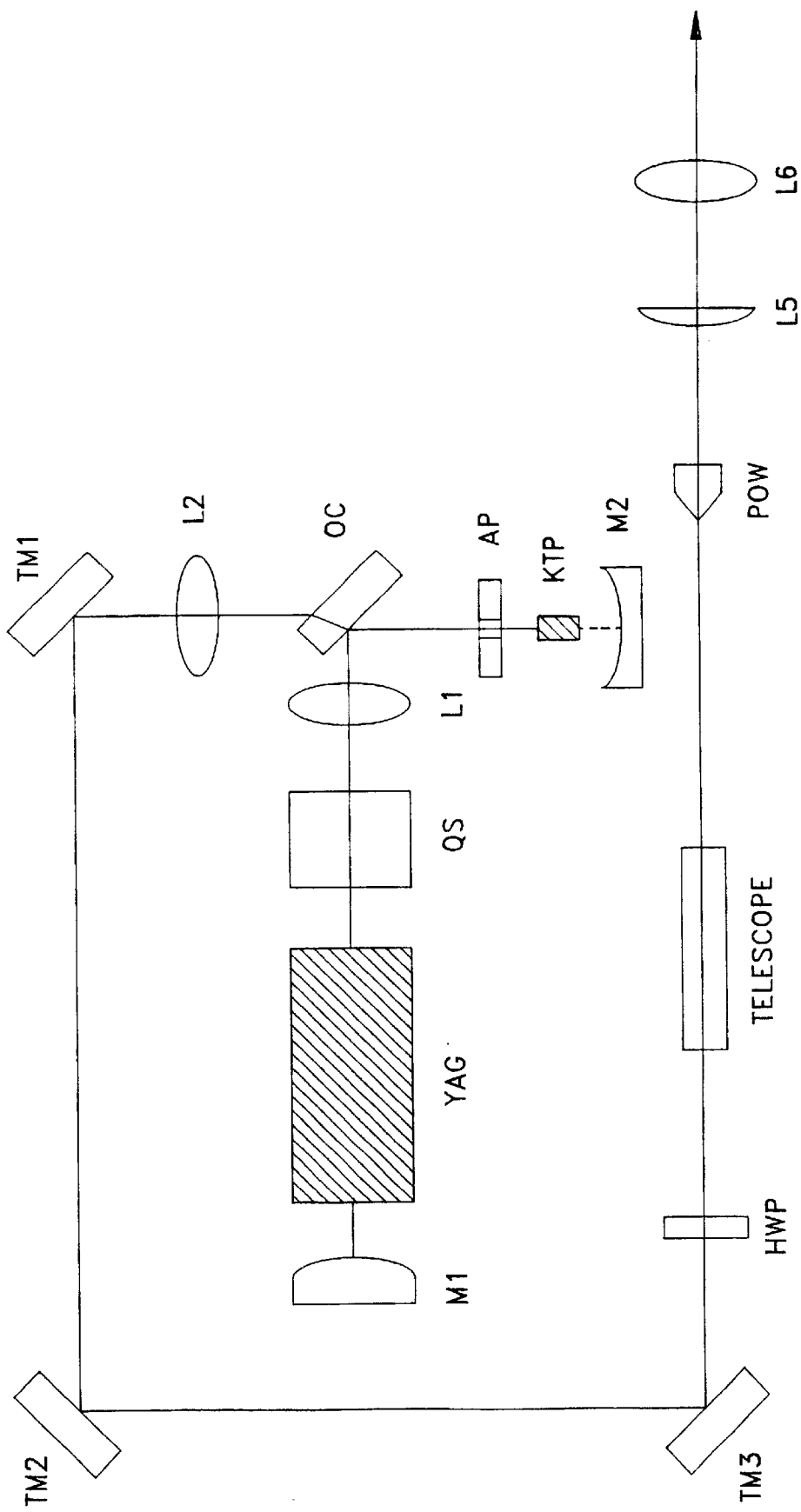
FIG. 3 is a solid state green laser cavity design.

FIG. 3 shows an optical layout of the solid state green laser with controlled multimode operation. The green laser uses an L-shaped cavity formed by two cavity end mirrors (M1 and M2) and an output coupler (OC). Inside this cavity, there is a cw lamp pumped Nd:YAG rod housed in a laser pump chamber (YAG), an acousto-optic Q-switch (QS) which provides repetitive pulsing operation, an intra-cavity focusing lens (L1), a nonlinear crystal (KTP) which converts 1064 nm emission from Nd:YAG into 532 nm, and an intra-cavity aperture (AP), which controls output mode of operation. The green beam exits the laser at the output coupler (OC) and travels through a series of turning mirrors (TM1~TM3), a collimating lens (L2) and a zoom telescope (TELESCOPE), before entering a cylindrical asphere lens (POW) which converts a laser beam having Gaussian intensity distribution into a thin line of uniform intensity.

Finally, instead of Type II KTP shown in FIG. 3, an alternative frequency doubling crystal option is Type II LBO.

Figure 4:
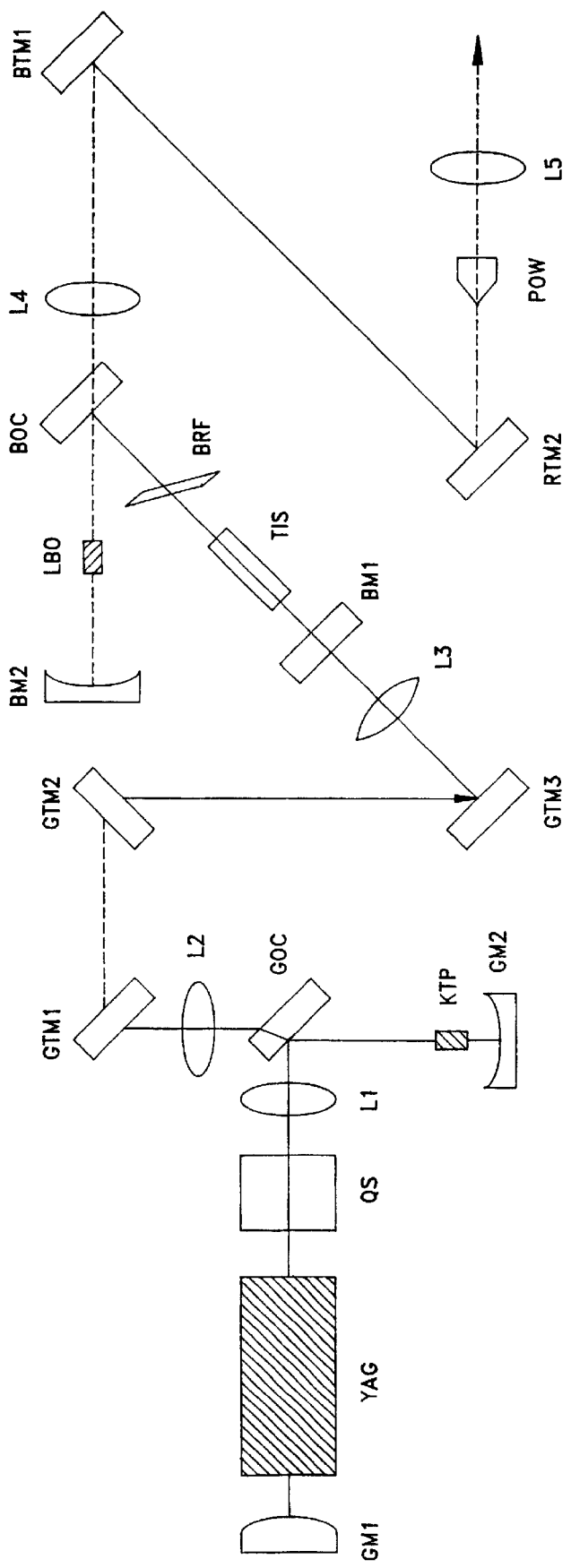
FIG. 4 is a solid state tunable blue laser cavity design.

FIG. 4 shows an optical layout of the solid state, pulsed blue laser. The similar pulsed green laser, utilizing cw lamp pumped Nd:YAG disclosed in solid state, pulsed green laser embodiment, minus the intra-cavity aperture, produces a high powered, pulsed green beam. It exits from a green laser output coupler (GOC) and travels through a series of turning mirrors (GTM1~GTM3) and a collimating lens (L2). It longitudinally pumps a Ti:Al$_2$O$_3$ (Ti:S) rod, which is located inside of a V-shaped cavity formed by two blue cavity end mirrors (BM1 and BM2) and a blue output coupler (BOC). The output laser emission from the Ti:Al$_2$O$_3$ rod is tuned to approximately 900 nm by coatings of blue laser cavity optics and intra-cavity placement of a birefringent plate (BRF). Depending on wavelength tunability requirements, multi-layers of birefringent plates may be used. The 900 nm emission is intra-cavity, frequency-doubled to produce blue emission of 450 nm by a nonlinear crystal (LBO). Alternatively, Type I BBO can be used instead of Type I LBO shown in FIG. 4. The cylindrical asphere lens (POW) placed outside the blue laser cavity performs the uniform intensity line generation task.

Figure 5:
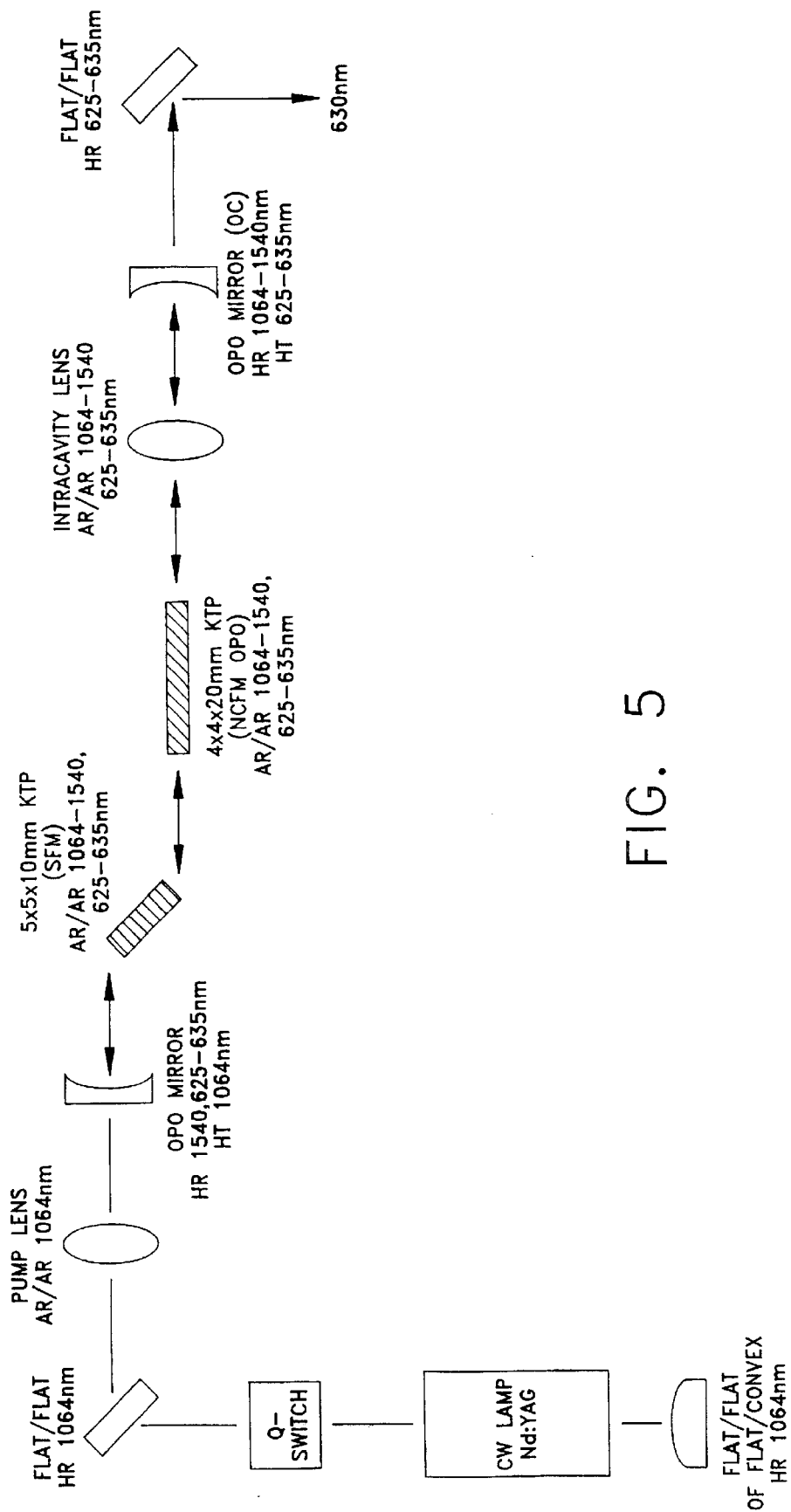
FIG. 5 is a solid state red laser cavity design.

FIG. 5 shows a schematic layout of the solid state, pulsed red laser. A cw lamp pumped Nd:YAG produces 1064 nm laser emission and repetitive pulsing action is performed by an acousto-optic or electro-optic Q-switch. Pumped by pulsed 1064 nm emission, a nonlinear crystal KTA produces emission of 1520~1540 nm through an optical parametric oscillation (OPO) process. A separate nonlinear crystal Type III KTP combines 1520~1540 nm emission from KTA and 1064 nm emission from Nd:YAG through sum of frequency mix (SFM) process to produce red emission of 626~629 nm, which exits from an output coupler (OC). Although Type III KTP is shown in FIG. 5 as a nonlinear crystal to perform sum of frequency mix operation, another KTA or Type I LBO can be used for the SFM process.

Finally, FIG. 5 shows all the components in the same cavity (intra-cavity design); however, the sum of frequency mix process may be performed in a separate cavity.

The all solid state red, green and blue pulsed laser embodiments disclosed here are incorporated in laser video projection system shown in FIGS. 1 and 2.

Figure 6:
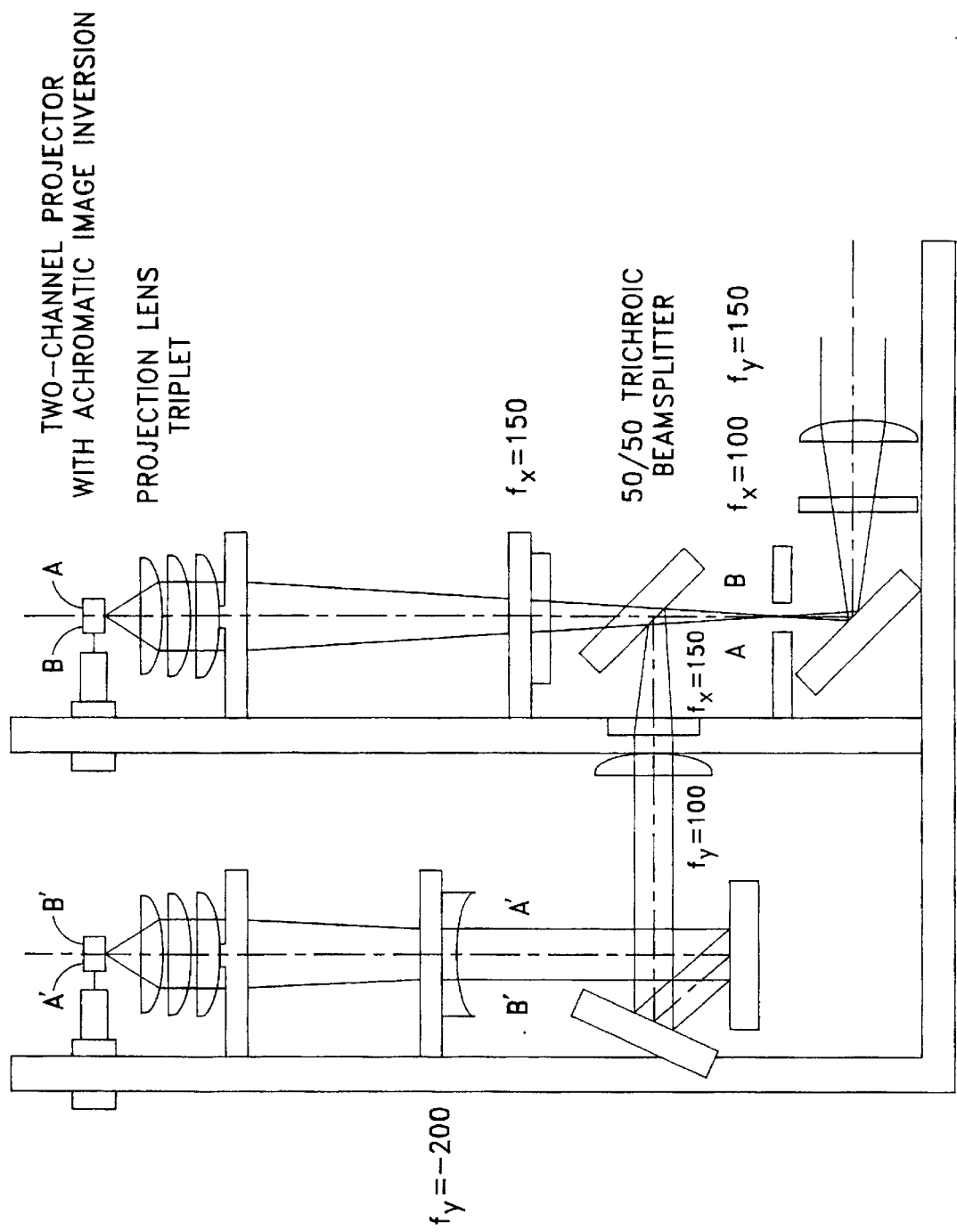
FIG. 6 is a two channel output with achromatic image inversion.

FIG. 6 shows more detailed optical design incorporating 50/50 trichroic beam splitter and optical means to invert the reflected image, so that its image geometry is the same as the transmitted one.

Figure 7:
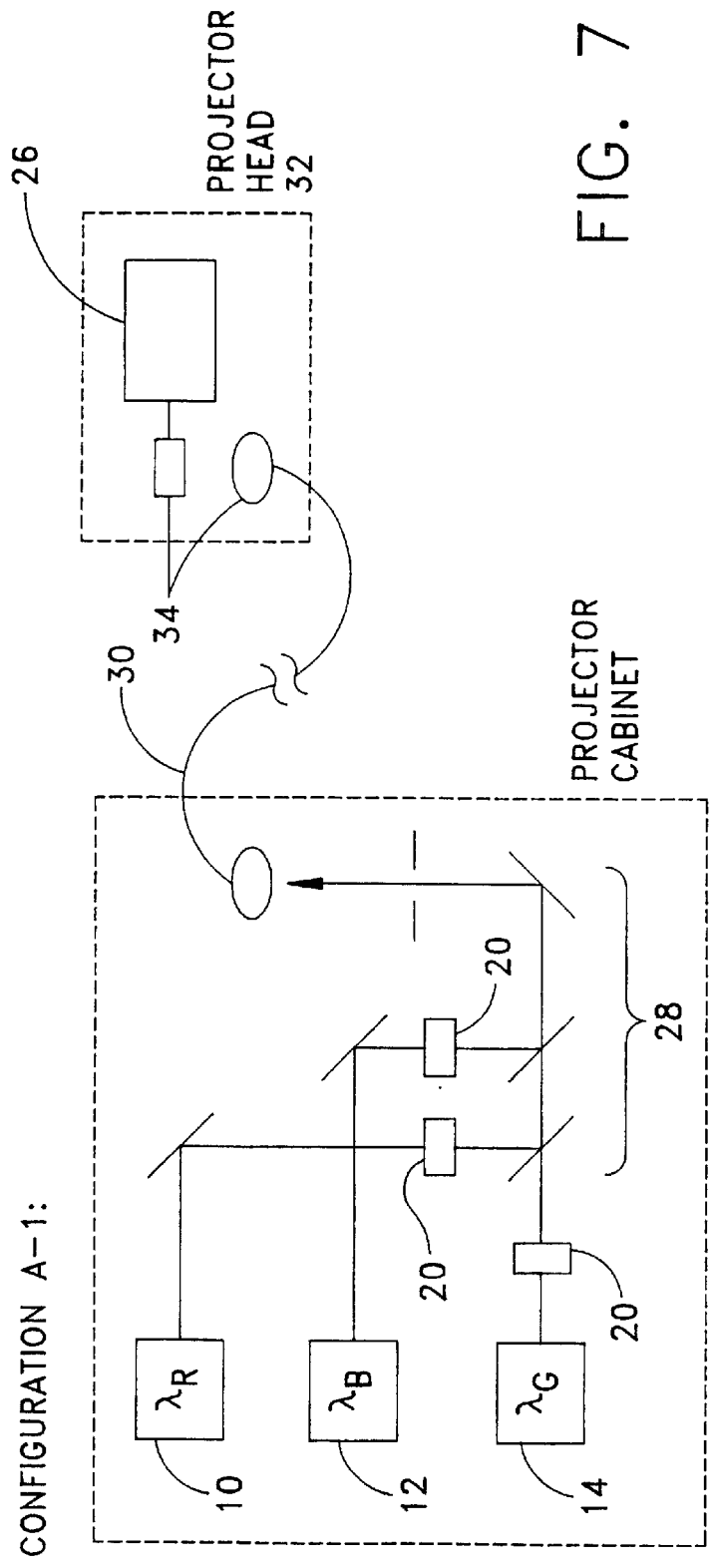
FIG. 7 is a remote image delivery by coherent fiber ribbon (single projector/single display)
Figure 8:
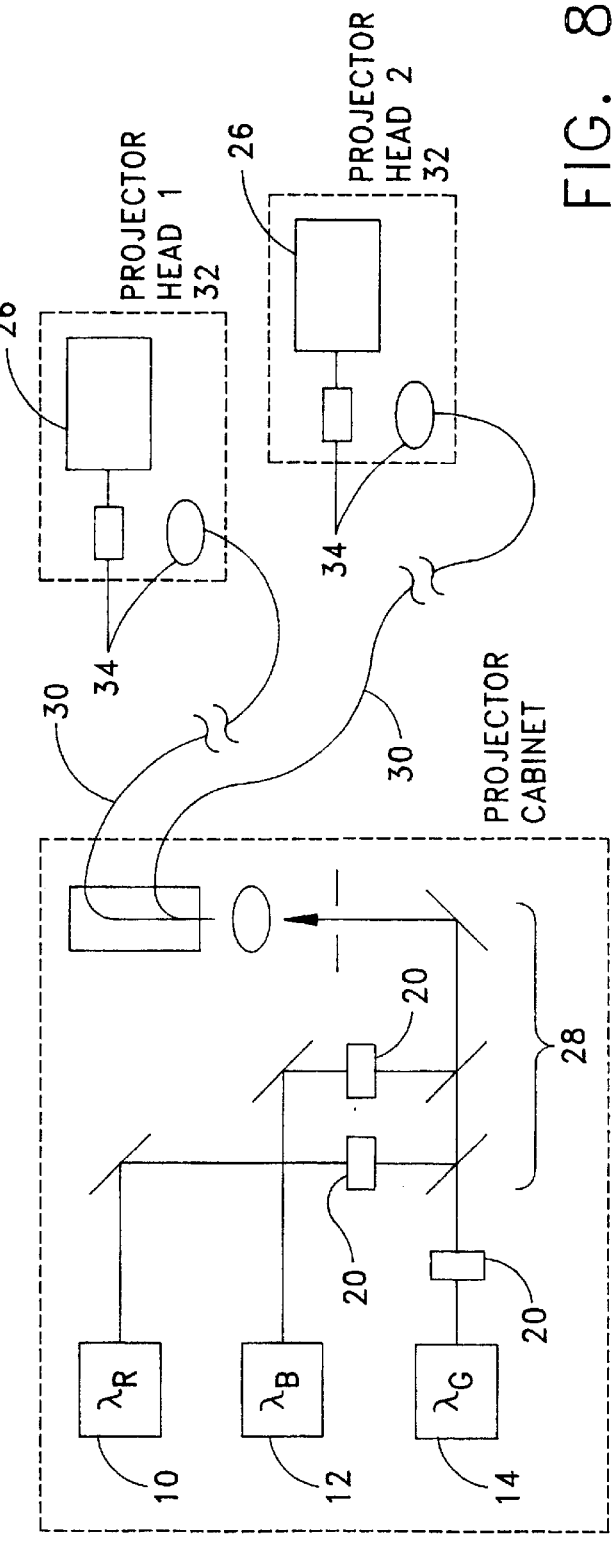
FIG. 8 is a remote image delivery by coherent fiber ribbons (single projector/multi-display)

Schematic design diagrams illustrating these two separate applications are shown in FIG. 7 and FIG. 8 respectively.

Figure 9:
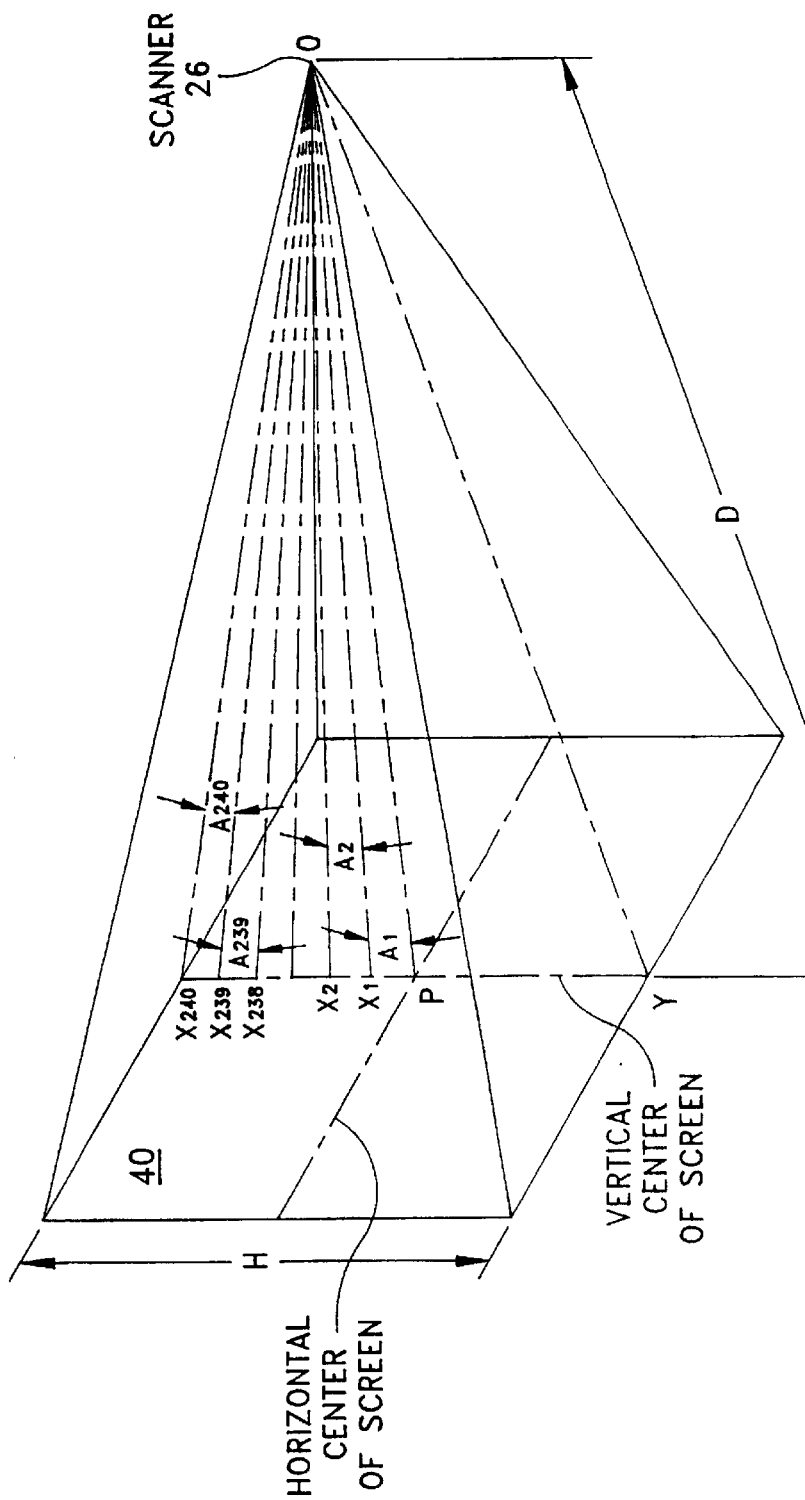
FIG. 9 is a tangential correction for vertical scanner.

FIG. 9 describes the desired effect of tangential correction on a projection screen 40 (or image plane) when the vertical scanner 26 is driven by a ramp signal, including nonlinear tangential correction discussed in this invention.

FIG. 9 shows a line spacing between each horizontal line (shown here as the width of each horizontal line) equal to L, which is equal to H/N, where H is the height of the screen and N is the total number of horizontal lines of the image (vertical resolution of the image).

What is claimed is:

1. A full color laser video image system, which system comprises:
   a) a pulsed laser light source to provide a pulsed laser beam, which comprises:
      i) an all solid state green (G) laser with controlled multimode operation to minimize speckle;
      ii) an all solid state tunable blue (B) laser; and
      iii) an all solid state red (R) laser utilizing sum of frequency mix;
   b) an acoustical-optical cell means to provide sound transmittal and a transducer to produce sound waves;
   c) signal means to drive the transducer and provide an input video signal and an output video signal;
   d) a projection means to produce a full color laser video image;
   e) a projection screen with a surface to receive and display the full color projection image;
   f) a beam splitter means to split the full color video image in half, to transmit one-half of the video image and to reflect the other half of the video image;
   g) means to apply achromatic correction on the reflected half of the video image;
   h) means to invert the reflected half of the video image to the same image geometry as the transmitted image; and
   i) means to scan vertically the corrected, inverted, reflected half of the video image and transmitted image to synchronize said two images.

2. The system of claim 1 wherein the projection means includes an optical subsystem, which comprises a cylinder asphere lens and a pair of cylinder lens to convert the laser beam into a collimated, uniform intensity thin line.

3. The system of claim 1 which includes means to deliver the full color image by a coherent fiber ribbon.

4. The system of claim 1 which includes electronic means to provide horizontal video line data expansion, which comprises:
   i) means to store an input video data signal into line or frame buffers;
   ii) means to retrieve the stored data at a different rate than the input video data signal;
   iii) means to transmit an output video data signal at a slower rate than the input video data signal rate; and
   iv) means to transmit the retrieved stored data signal to the one or more transducers on the acoustical-cell means.

5. The system of claim 1 wherein the green (G) laser comprises a cw lamp pumped, repetitively Q-switched, frequency doubled Nd:YAG laser.

6. The system of claim 1 wherein the blue (B) laser comprises a frequency doubled, Ti:Sapphire laser which is longitudinally pumped by a cw lamp, repetitively Q-switched, frequency doubled Nd:YAG laser.

7. The system of claim 6 which includes a birefringent plate to receive the laser light from the Ti:Sapphire laser; and means to adjust the angle of birefringent plate to tune the blue light wavelength desirable.

8. The system of claim 1 wherein the red (R) laser comprises:

i) a cw lamp pumped, repetitively, Q-switched Nd:YAG laser to produce a 1064 nm beam;
   ii) a potassium titanyl arsenate (KTA) pumped by the 1064 nm beam to produce 1520–1540 nm beams; and
   iii) a sum of frequency mix to produce red (R) light of 626 nm and 629 nm.

9. The system of claim 3 which includes:
   i) a first optical image divider means to divide the full color image in half;
   ii) first and second coherent fiber ribbons, each to receive the half image; and
   iii) a first and second projection head which includes a set of optics and a vertical scanner connected to the first and second ribbons respectively.

10. The system of claim 1 which includes a nonlinear controlled vertical scanner means, driven by nonlinear ramp signals, to provide an equally-spaced angular displacement motion of each horizontal line on the projection screen surface.

11. The system of claim 1 which includes means to correct the "pin cushion" effect of the projection image on the projection screen, and to increase the pixel time corresponding to the center of the projection image, and to decrease the pixel time at or about the four corners of the projection image.

12. The system of claim 11 which includes a master clock circuit for pixel interval and a sub-clock circuit to correct pixel time across a given horizontal video line of the projection image.

13. The system of claim 1 wherein
   the green (G) laser is a diode laser pumped, all solid state, pulsed green (G) laser to produce green output of 532 nm or 523.5 nm with controlled multimode operation to minimize speckle;
   the tunable blue (B) laser is a diode laser pumped, all solid state, pulsed blue (B) laser with blue output of 450 nm or 447 nm; and
   the red (R) laser is a diode laser pumped, all solid state, pulsed red (R) laser with sum of frequency mix means to produce red output between 626 nm and 629 nm.

14. A full color laser video system which comprises a pulsed laser light source with an input beam; means to modulate the input beam to provide electrical signals representative of the video image; and projection means to project the image onto a projection screen for display, which system includes:
   a) a beam splitter means to split the video image in half; and to transmit one-half the video image and to reflect the other half of the video image;
   b) means to correct achromatically the reflected half of the video image;
   c) means to invert the reflected half of the video image; and
   d) means to scan vertically the corrected, inverted, reflected half of the video image and the transmitted half of the video image to provide a synchronized, full color video image on two different projection screens.

* * * * *